(No Model.) 2 Sheets—Sheet 1.
C. C. BUTTERBAUGH.
CAR TRUCK.

No. 431,554. Patented July 8, 1890.

Witnesses
M. C. Galet
James R. Emanson

Inventor
Cornelius C. Butterbaugh
G Hazard & Townsend
his Atty.

(No Model.) 2 Sheets—Sheet 2.

C. C. BUTTERBAUGH.
CAR TRUCK.

No. 431,554. Patented July 8, 1890.

Witnesses
M. C. Galen
James R. Finlayson

Inventor
Cornelius C. Butterbaugh
by Hazard & Townsend
his attys

UNITED STATES PATENT OFFICE.

CORNELIUS C. BUTTERBAUGH, OF LOS ANGELES, CALIFORNIA.

CAR-TRUCK.

SPECIFICATION forming part of Letters Patent No. 431,554, dated July 8, 1890.

Application filed February 3, 1890. Serial No. 339,021. (No model.)

*To all whom it may concern:*

Be it known that I, CORNELIUS C. BUTTERBAUGH, a citizen of the United States, residing at Los Angeles, in the county of Los Angeles and State of California, have invented a new and useful Self-Adjusting Anti-Friction Car-Truck, of which the following is a specification.

The object of my invention is to provide an anti-friction car-truck which will adjust itself to the direction of the track, holding each axle at right angles to the rails while on a straight track and throwing each axle into the radial line of the track whenever a curve is encountered, thereby avoiding the strain and friction upon the rails and wheels, which results when the flanges of the wheels are relied upon to turn the car at curves, as is the case with trucks as at present constructed.

My invention, broadly stated, consists of the combination of the body of the car, two axles pivotally connnected with the body of the car at one end thereof and provided with wheels, swiveling mechanism operatively connecting such axles with each other arranged so as to cause the swiveling movement of one axle in one direction to produce a corresponding swiveling of the other axle in the reverse direction, and mechanism operatively connecting such swiveling mechanism with the body of the car near the middle thereof, whereby in rounding a curve the displacement of the middle of the car with relation to the middle of the track is caused to swivel the axles into positions radial with the curve.

My invention also comprises features of construction hereinafter more fully set forth.

The accompanying drawings illustrate my invention.

Figure 1:
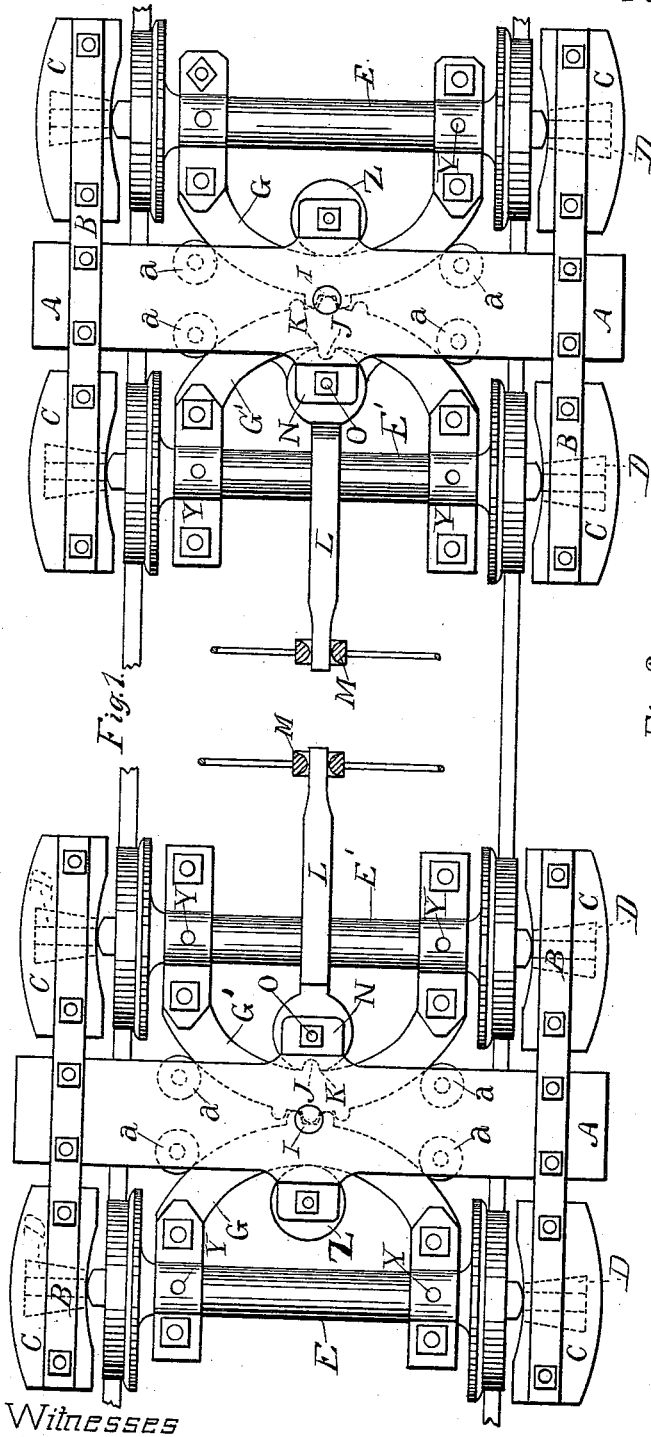
Figure 2:
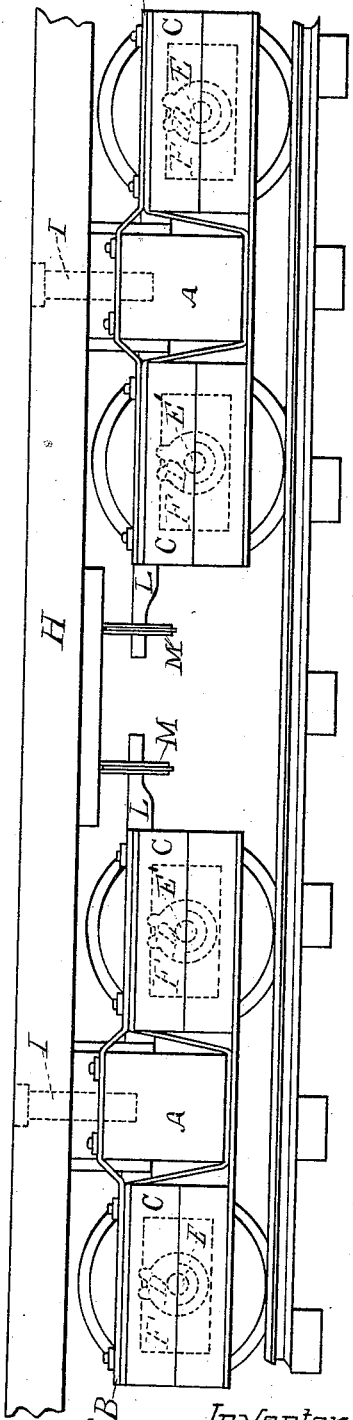
Figure 3:
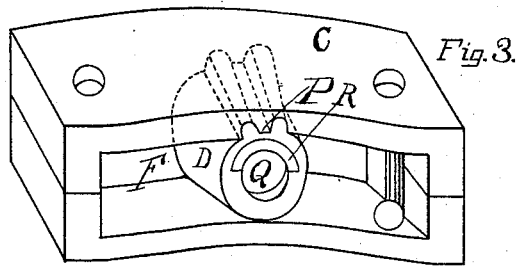
Figure 4:
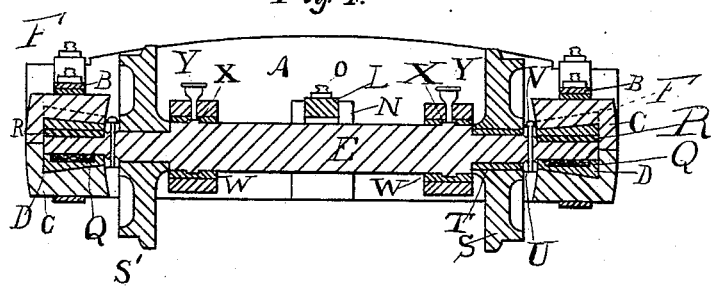
Figure 5:
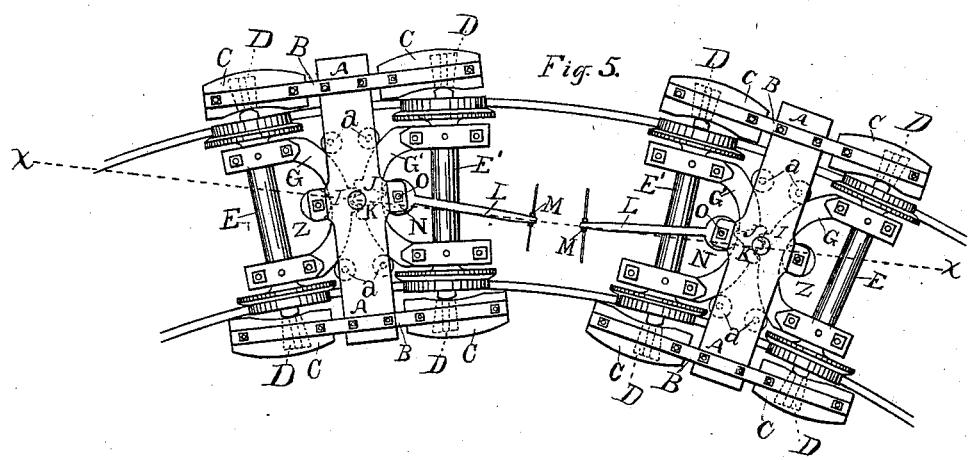

Figure 1 is a plan view of the two trucks of a car provided with my invention in position on a straight track, the body of the car being removed to expose the trucks. Fig. 2 is a side elevation of the trucks and a portion of the body of the car. Fig. 3 is a detail of the box and bearing for the ends of the axles. Fig. 4 is a vertical cross-section of one of the trucks, taken along the mid-line of an axle. Fig. 5 is a plan view of the trucks of a car provided with my invention on a curved track, the mid-line of the body of the car being indicated by a dotted line $x\ x$.

In constructing my improved car-truck, I use the centers of the several axles as the basal points from which to make my proportional measurements.

The frame of the truck consists of the cross-beam A and side bars B. The axle-boxes C are secured to the body of the car through the medium of truck-frame A B, which is pivoted to the body of the car king-bolt I, and each axle-box is chambered to receive a frusto-conical sleeve D, in which the several ends of axle E respectively rotate. Each sleeve is the frustum of a cone coaxial with its car-axle E and having its apex coincident with the center of the axle, and the chambers F taper to conform to the taper of such cone and form arcs of the circle which such sleeves would describe were the axle to be rotated in a horizontal plane with its center, as a pivot. It will thus be seen that the axles are swiveled to their trucks. Each axle is provided with an arc rack G G' journaled thereon. The two arc racks of each truck project toward each other and toward the center of the beam A, where they are in operative engagement with each other, being respectively provided with teeth which mesh, the teeth of one rack meshing with the teeth of the other, so that a partial rotation of one arc rack in one direction will cause a corresponding rotation of the other arc rack in the other direction. The axis of rotation of each arc rack passes through the center of and at right angles to the axis of the axle upon which such arc rack is journaled.

The construction above described permits a partial rotation of the axles in a horizontal plane, the center of each axle being the pivotal point for such rotation of such axle, and it causes an interdependent reverse rotation of the two axles of each truck, so that when one axle is turned to an angle with the axis of the cross-beam A the other axle will be thrown into a corresponding reverse angle, so that the axis of the cross-beam and the two axles of the truck will be in radial lines from a common center.

In practice each car is provided with two trucks—one at each end—and these trucks are coupled together, so that they correspond with each other in their pivotal movement, and when one axle is thrown out of right angles with the axis of the body of the car all the axles of the car are thrown into the radials of a common center which is determined by the curvature of the track. The mechanism by which the two trucks are thus operatively coupled together consists, first, of the body H of the car, to which the cross-beams A of the trucks are pivoted by king-bolts I in the ordinary manner. The racks G' G', journaled upon the axles E' E', nearest the middle of the car, are each provided on the inner side with a cog J, fitting in an indent K in the short arm of its pivoted lever L, which is thus brought into operative engagement with the inside of the rack. The long arm of the lever extends from its pivot toward the center of the car, and is secured to the body of the car by suitable means, such as the vertical guides M, which are attached to the under side of the car and allow vertical but not lateral play of the ends of the long arms of such levers. The levers are pivotally secured to their respective cross-beams by brackets N and pivots O. The operation of the levers and axles is made apparent by Fig. 5. When the wheels of the front axle of the car strike the curve, the mid-line of the body of the car begins to form the chord of the arc of the curve, thus throwing the guides M M out of their normal position over the center toward the inner side of the curve, thus operating the levers L to rotate racks G' G' proportionate with the degree of the curve. These racks operate their respective axles and the racks G G, which in turn operate their respective axles, and all the axles are thereby brought into the radii of the curve, and the tendency of the wheels is to run round the curve until the direction of the track changes. Immediately the front wheels of the car reach a change in the direction of the track the position of the guides M is again changed and the axles thrown into position to cause the wheels to follow the track. The top of each of the frusto-conical sleeves is provided with teeth to engage a corresponding rack P in the top of box C, so that while the sleeve is free to partially rotate it is held from slipping out of position.

The top of the axle-box and sleeve sustain the weight of the car, and provision for oiling the axle is made by forming an oil-chamber Q in the lower half of the inside of the sleeve, in which waste and oil are put. In order to reduce the friction, I fit a brass plate R in the top of the inside of the sleeve to form a bearing for the axle. To prevent sliding of the wheels one of the wheels S of each axle is journaled to revolve upon such axle, and I fit a brass thimble T upon the axle to form a bearing for the wheel. The other wheel S' is shrunk upon the axle and revolves therewith. Washers U are screwed upon the axle and engage with the wheels to hold them in place. The washers are fixed in place by pins V passing through the axle.

W W are the brasses of the journals of the arc racks, and are held in place by the annular rib X, which projects from the axle. Provision for lubricating the bearings may be made by means of oil-cups Y, as shown in the drawings, or by an oil-well and waste, as is common. Rollers Z respectively engage with the inner or concave faces of arc rack G, and rollers a engage with the outer faces of the several arc racks to hold them firmly in place.

Now, having described my invention, what I claim as new, and desire to secure by Letters Patent, is—

1. The combination of the body of the car, two axles pivotally connected with the body of the car at one end thereof and provided with wheels, swiveling mechanism operatively connecting such axles with each other arranged so as to cause the swiveling movement of one axle in one direction to produce a corresponding swiveling of the other axle in the reverse direction, and mechanism operatively connecting such swiveling mechanism with the body of the car near the middle thereof.

2. The combination of the body of the car, the two truck-frames, respectively pivoted to the body of the car at the ends thereof, the chambered axle-boxes, the axles, the frusto-conical sleeves, the arc racks journaled upon the axles and projecting toward each other and in operative engagement with each other, the pivoted levers, each engaging by one arm the inside of its respective rack and connected by the other arm with the body of the car near the middle thereof.

3. The combination of the body of the car, the frame of the truck pivoted to the end thereof, the two axles swiveled to the truck and provided with wheels, the two arc racks respectively journaled upon their axles and having their outer convex faces in operative engagement with each other, the lever pivoted to the truck and having its long arm connected with the body of the car and having its short arm in operative engagement with the inner side of its arc rack.

4. The combination of the car-axles, the frusto-conical sleeves on the ends thereof, each sleeve being the frustum of a cone coaxial with the car-axle and having its apex coincident with the center of the axle, and the boxes each provided with a chamber tapered to conform to the taper of such cone and formed in the arc of the circle which said sleeves would describe were the axles to be rotated in a horizontal plane with the center of the axle as a pivot.

5. The combination of the car-axle, the frusto-conical sleeve having its top provided with teeth, and the chambered box provided with the rack to engage such teeth, as and for the purpose set forth.

CORNELIUS C. BUTTERBAUGH.

Witnesses:
JAMES R. TOWNSEND,
M. C. GALER.